W. C. CRANSTON.
TREAD ATTACHMENT FOR TIRES.
APPLICATION FILED APR. 8, 1919.

1,338,175.
Patented Apr. 27, 1920.

WITNESS:

INVENTOR

UNITED STATES PATENT OFFICE.

WILLIAM C. CRANSTON, OF PHILADELPHIA, PENNSYLVANIA, ASSIGNOR OF ONE-HALF TO CARL NAGEL, OF PHILADELPHIA, PENNSYLVANIA.

TREAD ATTACHMENT FOR TIRES.

1,338,175.  Specification of Letters Patent.  Patented Apr. 27, 1920.

Application filed April 8, 1919. Serial No. 288,549.

*To all whom it may concern:*

Be it known that I, WILLIAM C. CRANSTON, a citizen of the United States, residing at 1220 W. Dauphin street, Philadelphia, in the county of Philadelphia and State of Pennsylvania, have invented a new and useful Device for Tread Attachments for Tires.

My invention relates to an appliance which when attached to the wheel of a power vehicle permits the said power driven wheel to grip the mud or sand, etc., into which the wheel may have become sunken and raise itself out of the hole either alone or in conjunction with a board or bar laid across the hole or rut with which the applance then engages.

The device consists of a partial casing to fit over the tire of a wheel and is attached by straps or bands or other suitable means to the wheel. From the casing one or more parts project, their purpose being to act as grips or teeth for the wheel to which it is attached.

Figure 1:
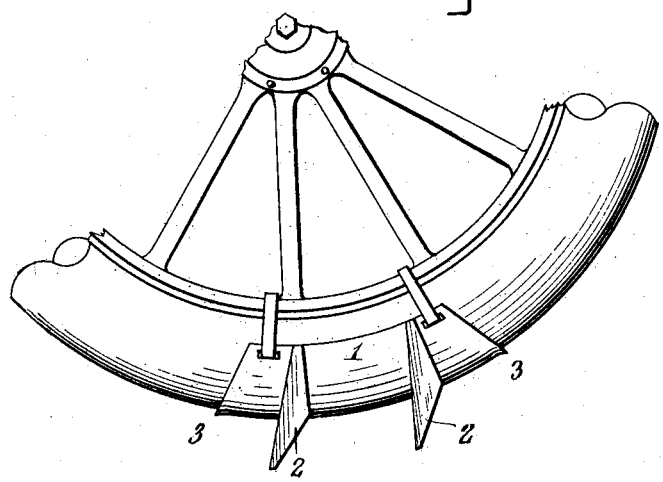
Figure 4:
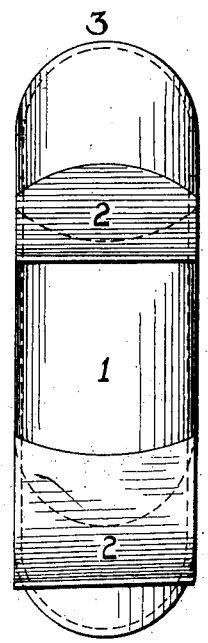
Figure 2:
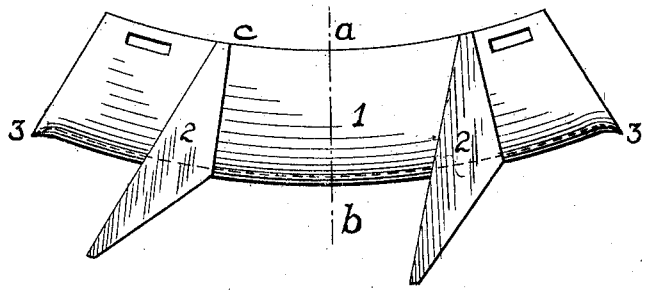
Figure 3:
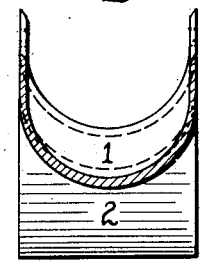

I attain these objects by the appliance illustrated in the accompanying drawing of which:

Figure 1 is a view of the device as attached to the wheel of an automobile. Fig. 2 is an enlarged side view. Fig. 3, a cross sectional view on the line *a—b* of Fig. 2 and Fig. 4 is a bottom view of the device.

Similar figures or numbers refer to similar parts throughout the several views.

In the drawing 1 is the casing made of metal or composition which is attached to the driven wheel of an automobile or other power vehicle by means of straps or bands or other practicable means. The parts 2 serve as teeth or grips for the wheel and are suitably attached to the casing by bolting, welding, etc., or may form an integral part of it. The edges 3 are beveled to protect the tire from being cut.

Ordinarily the teeth or grips 2 of the device will grip into the sand, mud, soil, snow, ice, etc., and afford ample traction to enable the wheel to move out of a hole or depression. It will also be observed that said teeth or grips, by virtue of their formation and arrangement relatively to the casing, are adapted to be readily withdrawn from the sand or mud in which they are embedded.

In some cases, as where the soil is extremely soft, the placing of a board or rod across the hole, rut or depression will permit one of the aforesaid teeth to engage with it and the force of the propulsion given to the wheel by the engine will enable it to raise itself up and out of the depression. The contact edge of each projecting part is so inclined to the outer edge of the casing of the device that it will grip and not push away the board or bar placed to come in contact with it.

The working side of each tooth or grip 2 is disposed at an acute angle to the longitudinal curvature of the casing 1 in order to increase the efficiency of the tooth or grip, and the opposite side of the tooth or grip is made in the form of an obtuse angle to enable the same to readily leave mud in which it is embedded, incidental to the rotation of the wheel. Moreover, each tooth or grip has side arms, Figs. 1 and 2, which receive between them the casing 1 and contribute greatly to the strong fixture of the tooth or grip on the casing.

The practical advantage of the tooth with the obtuse angle formation at one side will be better understood when it is stated that said formation lends increased strength to the tooth, and at the same time, because of the apex of the angle being coin ident with the periphery of the body, enables the tooth to freely withdraw from mud and the like.

Now therefore I claim—

A tread attachment for tires comprising an arcuate channeled body member, and a tooth integral with said member and having a flat working side disposed at an acute angle to the radius thereof and a flat opposite side that approaches the working side as the sides recede from the body member and also having arms at the opposite sides of the body member; the last-named side of the tooth and the corresponding sides of the arms forming obtuse angles, and the opposite sides of the arms being adapted to assist the working side of the tooth in its function.

WILLIAM C. CRANSTON.

Witnesses:
CARL NAGEL,
J. G. RHOADS.